United States Patent Office.

GEORGE SANGER, OF BELOIT, WISCONSIN.

Letters Patent No. 92,654, dated July 13, 1869.

IMPROVED DETERSIVE SOAP.

The Schedule referred to in these Letters Patent and making part of the same.

*To all whom it may concern:*

Be it known that I, GEORGE SANGER, of Beloit, Rock county, in the State of Wisconsin, have invented certain new and useful Improvements in the Composition and Manufacture of Detersive Soap; and I do hereby declare the following description to be sufficient to enable any person skilled in the art or science to which it most nearly appertains, to make and use my said invention or improvements, without further invention or experiment.

The nature of my invention and improvements consists in the composition and manufacture of an improved detersive soap, substantially after the following process, to wit:

Put into a steam soap-kettle eight hundred pounds of tallow; add two barrels of alkaline lye, made of soda-ash or the like, at twelve per cent., and start steam. Keep boiling and adding the lye until it is thoroughly made into soap. Then add three pecks of salt, dissolved in water, as strong as you can make it in the pickle, and boil the whole for half an hour. This will separate the soap from the spent lye. Stop steam, and let stand for two hours. The soap will then rise to the top of the lye.

Then draw off the spent lye from the soap, and add two barrels of good lye, at fifteen per cent., to the soap. Start steam; add six hundred pounds of resin in kettle, boiling and adding lye until the resin is thoroughly made into soap.

Then add one bushel of salt dissolved in water, and boil for one and a half hour, which will again separate the soap from the spent lye. Then stop steam, and let stand for three hours.

Then draw the spent lye from the soap, and add three barrels of lye, at fifteen per cent. Start steam, and keep boiling, and adding lye until the soap is so strong that it will take no more strength.

Then add one bushel of salt dissolved in water; boil for two hours, stop steam, and let stand for four hours.

Then draw the lye, and add one and a half barrel of water. Start steam, and keep boiling and adding water until it is well mixed, or, as it is called, in a settled state. Then stop steam, and let it stand over night.

In the morning dip into tubs, and add the ingredients below named, and continue stirring until cool, viz: three hundred and fifteen pounds of sal-soda, seventy-five pounds of wheat flour, eight pounds of ammonia, one gallon of alcohol, twenty-five pounds of whiting, and thirty pounds of palm-oil.

What I claim as my invention and improvements, and desire to secure by Letters Patent, is—

The soap, consisting of the above-enumerated ingredients, in about the proportions set forth, and prepared substantially in the manner herein described and specified.

GEORGE SANGER.

Witnesses:
H. P. JOHNSON,
R. F. DUTTON.